United States Patent [19]

Fales, III et al.

[11] Patent Number: 4,971,346
[45] Date of Patent: Nov. 20, 1990

[54] PORTABLE REMOVABLE BICYCLE STAND

[76] Inventors: Myron S. Fales, III, 711 Chestnut, Bellingham, Wash. 98225; Daniel S. Lamb, 806 E. Maple, Bellingham, Wash. 98225

[21] Appl. No.: 322,407

[22] Filed: Mar. 13, 1989

[51] Int. Cl.⁵ ............................................. B62H 1/00
[52] U.S. Cl. ..................................................... 280/293
[58] Field of Search ............... 280/293, 294, 295, 298, 280/301, 304, 300

[56] References Cited
U.S. PATENT DOCUMENTS 575,529   1/1897  Stephens ............................ 280/300
4,591,180 5/1986  Copple ............................... 280/293

FOREIGN PATENT DOCUMENTS 672585  2/1939  Fed. Rep. of Germany ...... 280/293

Primary Examiner—Charles A. Marmor
Assistant Examiner—Alan M. Kagen
Attorney, Agent, or Firm—Richard C. Litman

[57] ABSTRACT

A stand for a bicycle that supports it at an angle, the stand comprising a single elongated member which attaches to the bicycle at two locations by means of slotted members which encircle the chain stays and crank spindle to support the bicycle. The opposite end of the elongated member serves to contact the ground, having a flat, angled surface adapted for this purpose. The stand is readily installed and removed, and is stored in a second location on the bicycle when the bicycle is in use.

7 Claims, 1 Drawing Sheet

PORTABLE REMOVABLE BICYCLE STAND

FIELD OF THE INVENTION

This invention relates generally to supports or stands for two-wheeled vehicles such as bicycles and more particularly, to an improved stand that is retained in its use position by the weight of the supported vehicle, without the need of any disparate fastening means.

BACKGROUND OF THE INVENTION

Stands to support bicycles in an upright position relative to the ground are as old as the bicycle itself, and in a general way can be divided into broad categories: stands which have a wide footprint to support the bicycle in an upright position with one wheel generally off the ground; and single-legged stands upon which the bicycle leans, stability being maintained by both wheels and the foot of the stand, in a three-point manner.

One form of the single-legged stand is the kickstand which is permanently fastened to the bicycle frame, and adapted to swing down into an earth-contacting position and held in place by a spring-loaded detent. The bicycle leans on the stand which supports it. Raising the bicycle to a vertical position permits the stand to be pivotally displaced to a horizontal storage position. This action is achieved by directly kicking the stand or peddling the bicycle and the stand is retained in the stowed position by a further detent.

The recent popularity of the so-called mountain bicycles designed for use in off-road locations has created a need for a stand which can be removed and stored safely elsewhere on the bicycle, as the classic kickstand is regarded as hazardous in an off-road environment.

Of the above two classes of bicycle stands, certain types are designed so as to be removable and portable. They can be removed from the bicycle and stored in a remote location, but are cumbersome and awkward to carry.

DESCRIPTION OF THE RELATED ART

Removable, portable bicycle stands are exemplified in many prior patents, such as the following:

U.S. Pat. No. 747,449 issued to Longbottom describes a bicycle support consisting of a straight member with projections on its upper end that fits between the chain stays on a bicycle frame and extends to the ground when in use, positioned at an angle with respect to the plane of the bicycle frame. The projections on the member engage the chain stays to retain the member in place against the weight of the bicycle.

U.S. Pat. No. 1,227,390 issued to Cook discloses a bicycle attachment comprising an elongated bar formed from wire or rod, which is positioned between the chain stays at an angle to the bicycle frame, retained in place by a curved upper end which encircles one chain stay, the lower end of the bar being in contact with the ground. The bar is retained in place by friction against the chain stay, the friction being created by the weight of the bicycle against the bar.

U.S. Pat. No. 3,712,637 issued to Townsend discloses a cycle stand of the center stand variety which supports a bicycle with one wheel off the ground.

U.S. Pat. No. 3,910,603 issued to Shipman discloses a bicycle side stand comprising a removable rod extending laterally from the bicycle to the ground, being held in place by a bracket mounted on the bicycle frame.

U.S. Pat. No. 4,591,180 issued to Copple discloses a bicycle stand comprising a single elongated support leg mounted on the bicycle frame in a first support position, with a cooperating finger and thumb which encircle both chain stays to hold the stand in place. The stand is removable and is adapted to be stored on the bicycle frame in a second storage position.

Notwithstanding these disclosures, all removable bicycle stands of the single-member variety do not provide adequate support in the direction of bicycle motion. Simply pushing on the bicycle in the direction of motion is usually sufficient to release the stand, toppling the bicycle. It is the purpose of this invention to prevent this toppling by providing supporting means in two directions—longitudinally along the bicycle's axis, and laterally to it.

SUMMARY OF THE INVENTION

Accordingly, the primary object of the present invention is to provide a single-member bicycle stand which can be readily attached to and removed from the frame of a bicycle, and which can be stored on the bicycle in a second location.

It is a further object to provide the bicycle stand with yoke members which encompass and captively engage the bicycle to support it against tipping and prevent forward or backward rolling motion.

It is another object to provide a bicycle stand which fits a wide variety of bicycles without adaptation.

Still another object is to provide a stand which, once installed, is held in place by the weight of the bicycle against it without additional clamps or latches.

Another object is to provide a stand which is readily stored on the bicycle in a second position.

A further object is to provide a stand which is easily portable, and convenient to carry.

With these and other objects in view which will more readily appear as the nature of the invention is better understood, the invention consists in the novel construction, combination and assembly of parts hereinafter more fully described, illustrated and claimed, with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
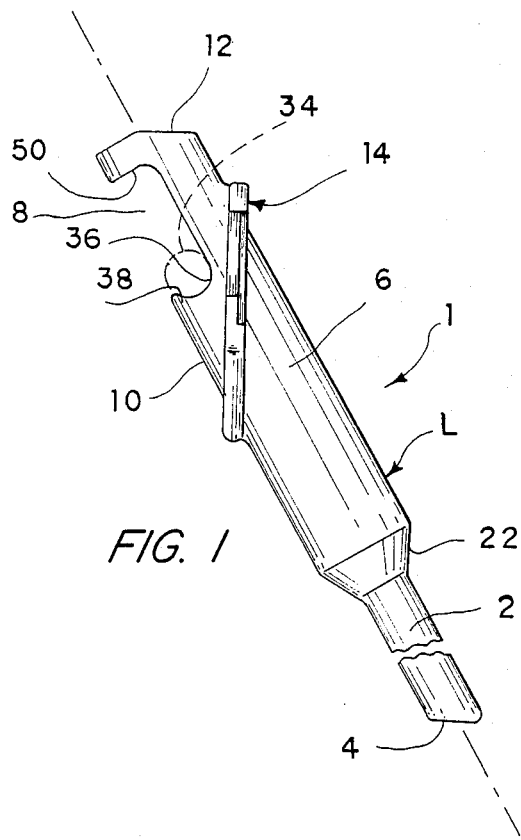
FIG. 1 is a left side elevational view of the bicycle stand of the present invention.
Figure 2:
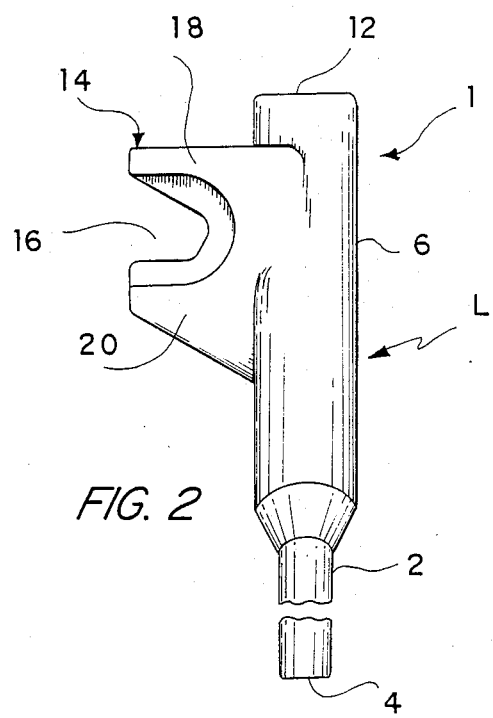
FIG. 2 is a front view of the bicycle stand of FIG. 1.

The bicycle stand of the present invention is shown as numeral 1 in FIGS. 1 and 2. The stand 1 is an elongated leg member L having a first or lower portion 2 terminating in an endmost ground-engaging surface 4, and a second or upper portion 6 having a recess or cut-out 8 formed in its inner face 10 adjacent the top end 12 of the stand. The cut-out 8 has an upper inner portion 50.

Figure 3:
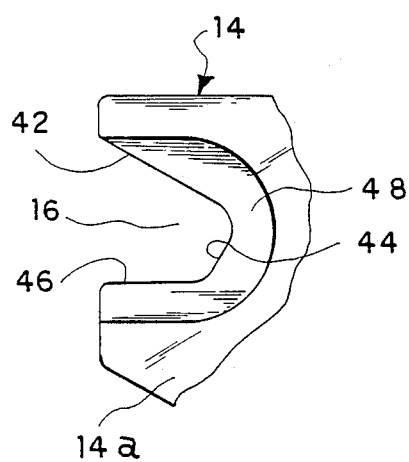
FIG. 3 is an enlarged, partial view illustrating the slot shown in FIG. 2.

Projecting laterally or forwardly of the leg upper portion 6 is a substantially planar tab 14 which, from FIGS. 2 and 3, will be seen to comprise a bifurcated member as defined by the flared slot or cut-out 16 intermediate the top portion 18 and the bottom portion 20.

The above described stand elements will be understood to comprise an integral member. As explained, a feature of the instant invention is that no supplemental or disparate means are required to attach the stand 1 to a bicycle as this attachment is accomplished in a positive manner by means of the laterally directed tab 14 and leg member cut-out 8 as will be described hereinafter. The stand may be constructed of any suitable metallic or non-metallic material such as cast aluminum or the like and in the interest of reducing its mass, the lower leg portion 2 may be formed of lesser diameter than the upper portion 6, being joined thereto by the tapered area 22.

Figure 4:
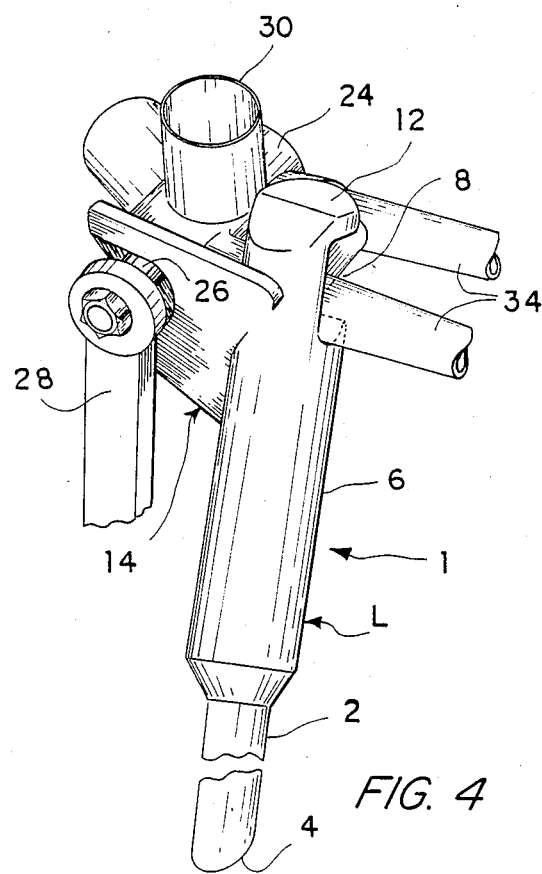
FIG. 4 is a top perspective view of the bicycle stand of the present invention in place on the frame of a bicycle.

Stand attachment employs frame structure existing on all bicycles, a variation of which is shown in the installed example of FIG. 4 wherein pertinent well known bicycle frame components are illustrated. The stand 1 is adapted to be attached to the bicycle frame F immediately adjacent the hub 24. As is recognized in the art, the transversely disposed hub 24 provides journal means for a spindle 26 to which the pedal cranks 28 are affixed. The exact configuration of the spindle and cranks will of course vary between makes and models of bicycles. Other frame structure usually includes a seat tube 30 and down tube 32. As is well known, the rear wheel (not shown) is mounted at the end of a pair of laterally spaced apart chain stay tubes 34—34. It is one of these chain stay tubes and the hub or spindle assembly that cooperate with specific components of the stand during its use.

The stand is applied by initially moving the leg inner face 10 toward the lefthand chain stay tube 34 until this tube is disposed within the leg cut-out 8. As shown in FIG. 1, the bottom of this cut-out is formed with an arcuate surface 36 terminating in an upwardly directed hook 38. It is within this area of the cut-out 8 that the bottom of the chain stay tube 34 is seated, as shown in FIG. 4. Arcuate surface 36, hook 38, and the upper inner surface 50 provide support and prevent a bicycle from forward movement within the stand 1. Thence, the user moves the stand 1 forwardly to engage the hub 24 or crank arm spindle 26 within the tab slot or cut-out 16. As most clearly illustrated in FIG. 1, the planar tab 14 is disposed in a plane which is substantially offset from the longitudinal axis 40 of the leg L. In this manner, when the tab 14 is captively retained between the crank arm 28 and hub 24 in a substantially vertical plane, the leg L will be positioned in the angular fashion as shown in FIG. 1, to properly support the bicycle when leaned toward the direction of the stand 1. The offset of the plane of the tab 14 relative the longitudinal axis 40 preferably falls within the range of 25-35 degrees, with a 30 degree offset having been found to properly accommodate many bicycles.

The tab slot 16 will be seen to be formed by an upper edge 42 that is inclined downwardly toward an inner edge 44, with the latter in turn joined to horizontal bottom edge 46. This configuration assists in urging the leg L upwardly as the slot 16 is moved between the crank arm 28 and the hub 24. A counterbore 48 is provided in the outer face 14a of the tab 14 and provides clearance for installations wherein the head of the crank arm is enlarged.

With the foregoing structure in mind, it will be appreciated that a simple maneuver permits one to attach the present stand 1 to a bicycle frame whereafter, the vehicle is tilted laterally in the direction of the applied stand until the leg bottom surface 4 abuts the ground. The bicycle is then supported, with its weight upon the stand insuring retention of the stand as the chain stay tube 34 bears against the bottom of the cut-out 8 while the tab is captively retained between the crank arm 28 and the hub 24.

Removal of the stand 1 is as simple as its attachment. One merely raises the bicycle from its leaning position so as to elevate the bottom surface 4 from the ground and thereafter, urges the stand rearwardly to remove the tab 14 from the position as in FIG. 4, whereupon the leg L is lowered to clear the tube 34 from its seated position within the cut-out 8. The stand may then be stored wherever desired, such as on the bicycle itself. The elongated configuration and light weight of the device lends itself to ready attachment to one of the frame tubes, such as by the spring clips (not shown) as used to retain tire pumps or water bottles to bicycles.

Due to the variations in bicycles in the length of the spindle 26 from the hub 24 and the diameter of the tubes 34, the stand 1 may require the weight of a bicycle to enable the stand to remain in the vertical position, thereby requiring the user to hold the stand 1 in the vertical position while attaching it to the bicycle.

It is to be understood that the present invention is not limited to the sole embodiment described above, but encompasses any and all embodiments within the scope of the following claims.

I claim:

1. A portable stand for a bicycle comprising:
   an elongated member having a solid cylindrical upper portion and lower portion;
   said upper portion having first and second bicycle support means;
   said first support means including a planar tab extending laterally from said elongated member and having a slot therein which engages about the crank spindle of the bicycle;
   said planar tab disposed essentially parallel to the plane of the bicycle frame when engaged about the bicycle crank spindle;
   said second support means comprising a recess in said elongated member which engages a chain stay tube on the bicycle, said recess is disposed within said elongated member substantially 90 degrees offset from the plane of said tab; whereby
   the combined engagement of said first and second support means by a bicycle serves to transfer the weight of the bicycle to said elongated member and thence to the ground therebeneath.

2. A portable removable stand for a bicycle according to claim 1 wherein;
   said stand comprises a rigid unitary member.

3. A portable removable stand for a bicycle according to claim 1 wherein;
   said tab comprises a planar element radially projecting from said elongated member.

4. A portable removable stand for a bicycle according to claim 1 wherein;
   said tab slot is bounded by a counterbore.

5. A portable removable stand for a bicycle according to claim 3 wherein;
   the plane of said planar tab is disposed between 25-35 degrees relative the longitudinal axis of said elongated member.

6. A removable stand for a bicycle comprising:

a rigid unitary device including an elongated member;

said elongated member having a solid cylindrical upper portion and a lower portion;

said upper portion having first and second bicycle support means;

said first support means including a fixed planar tab extending laterally from said elongated member and having a slot therein which engages about the crank spindle of the bicycle;

said planar tab disposed essentially parallel to the plane of the bicycle frame when engaged about the bicycle crank spindle;

said second support means comprising a recess in said elongated member which engages a chain stay tube on the bicycle, said recess is disposed within said elongated member substantially 90 degrees offset from the plane of said tab; whereby the combined engagement of said first and second support means by a bicycle serves to transfer the weight of the bicycle to the elongated member and thence to the ground therebeneath.

7. A removable stand for a bicycle according to claim 6 wherein;

said stand having a minimum overall length and compact configuration, allowing for unencumbered transportation of said stand to a remote location for safe storage.

* * * * *